Figure 1:
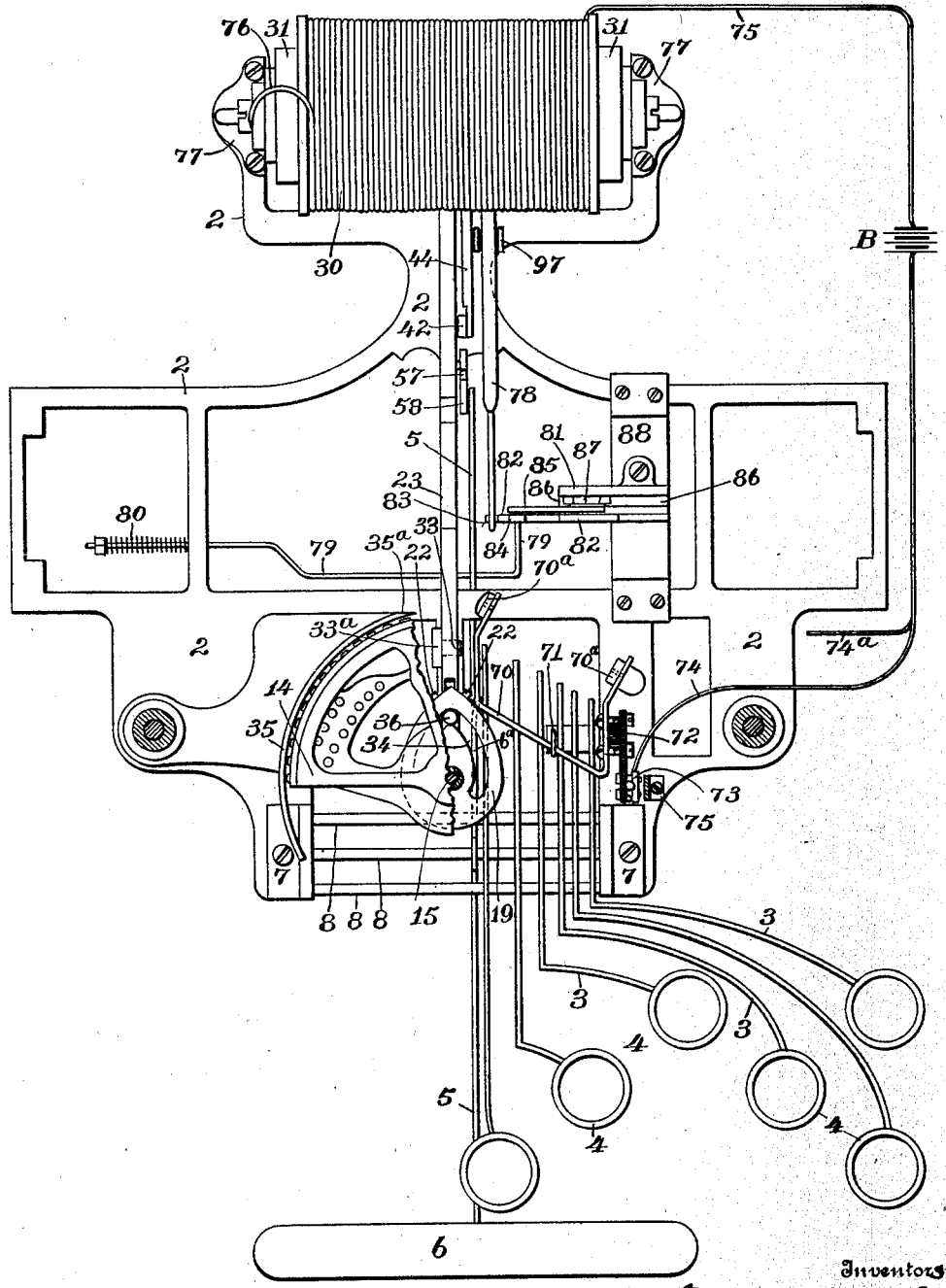

No. 718,929. PATENTED JAN. 20, 1903.
J. S. HARRISON & H. HILL.
TYPE WRITING MACHINE.
APPLICATION FILED APR. 12, 1902.
NO MODEL. 6 SHEETS—SHEET 1.

Witnesses
Inventors
Attorneys

No. 718,929. PATENTED JAN. 20, 1903.
J. S. HARRISON & H. HILL.
TYPE WRITING MACHINE.
APPLICATION FILED APR. 12, 1902.
NO MODEL. 6 SHEETS—SHEET 3.
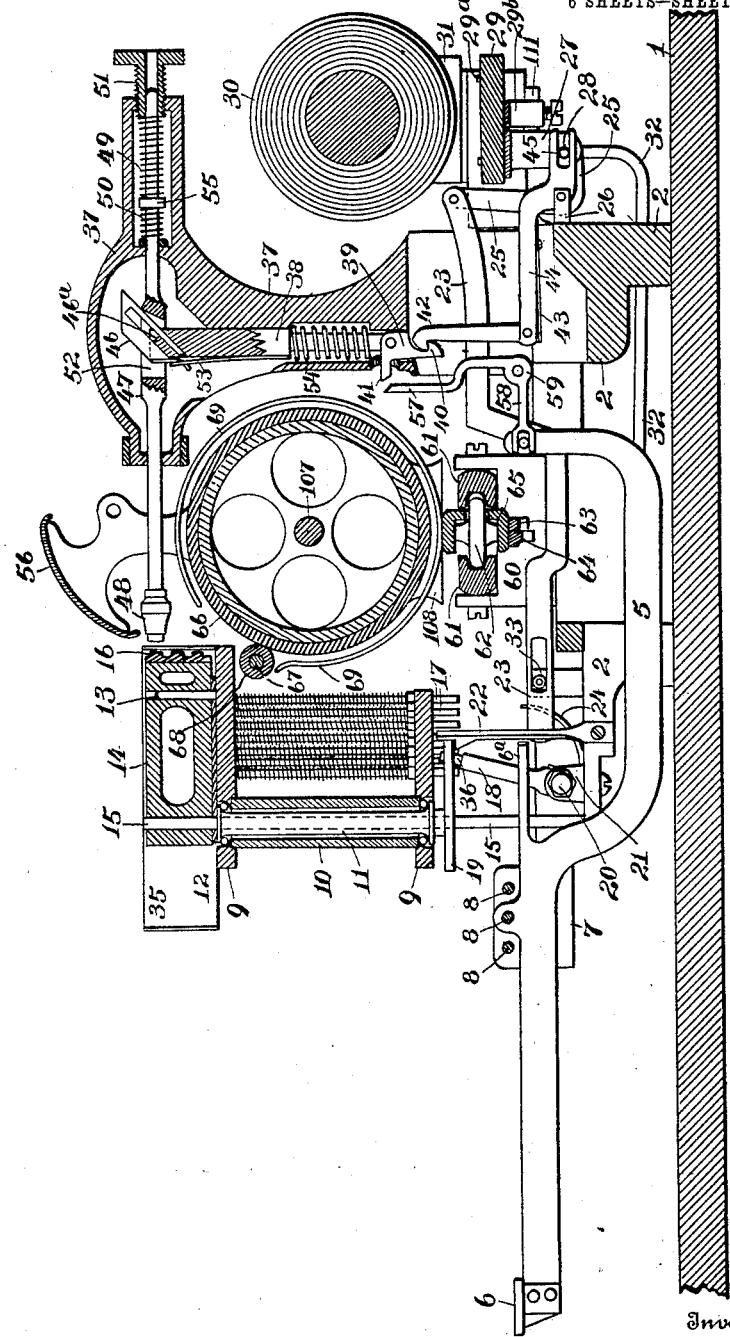

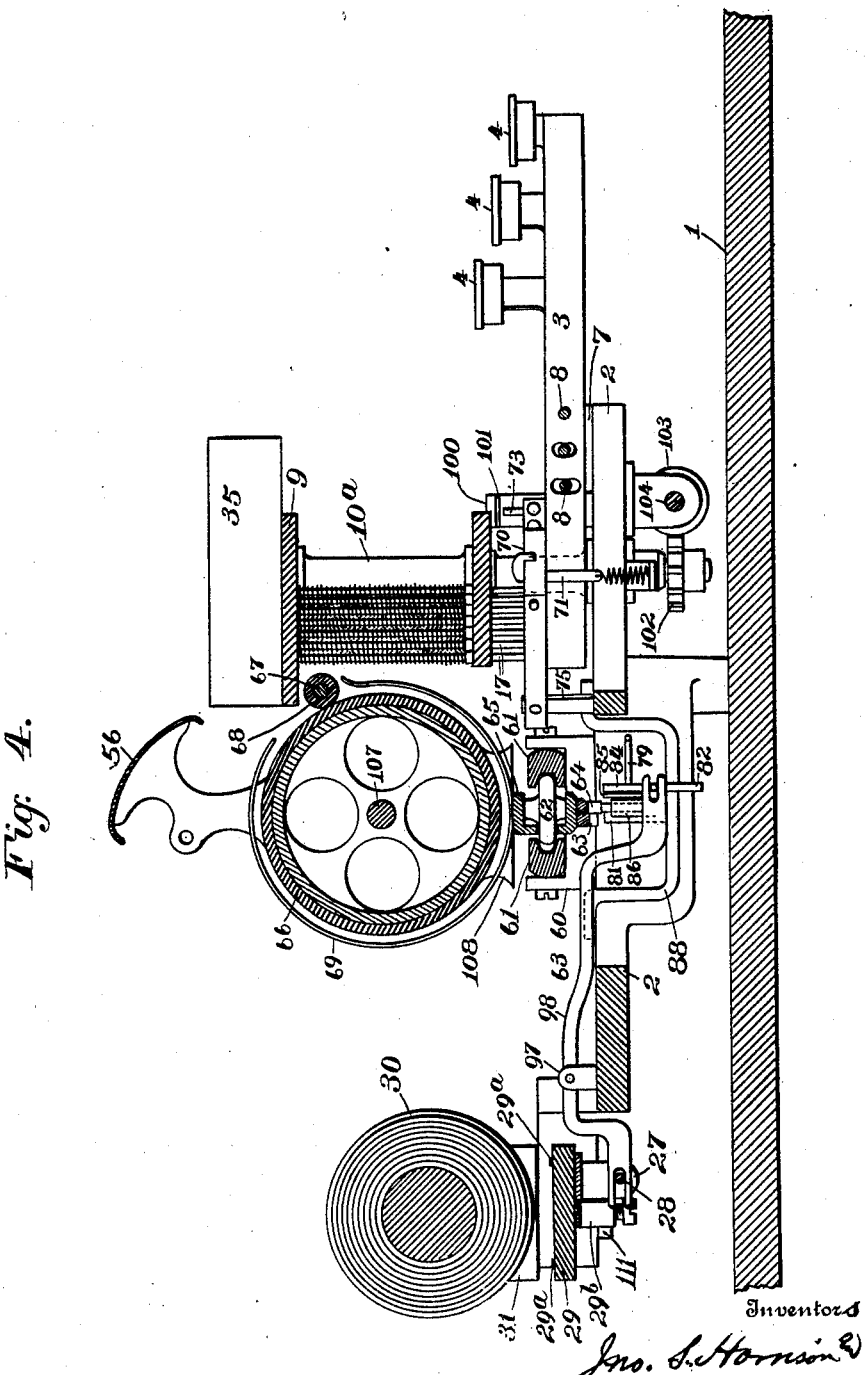

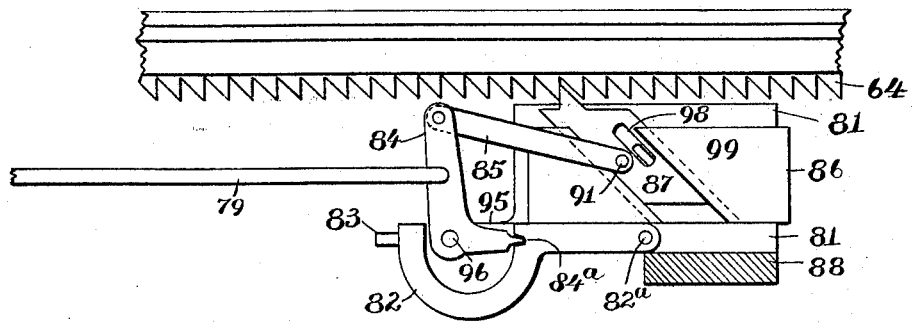
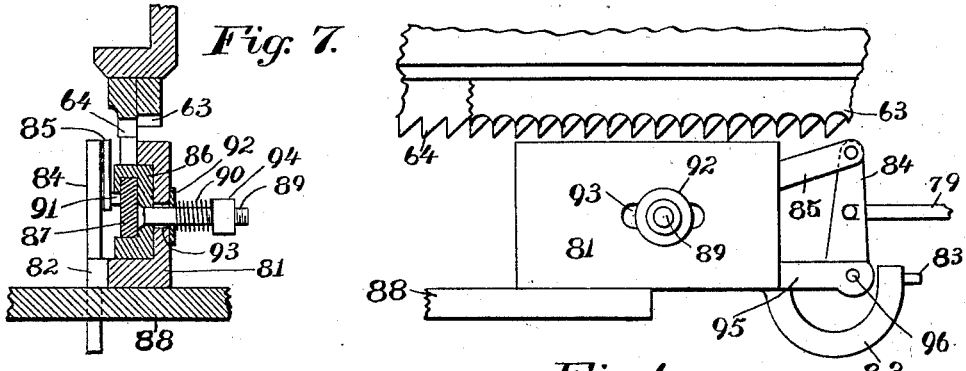
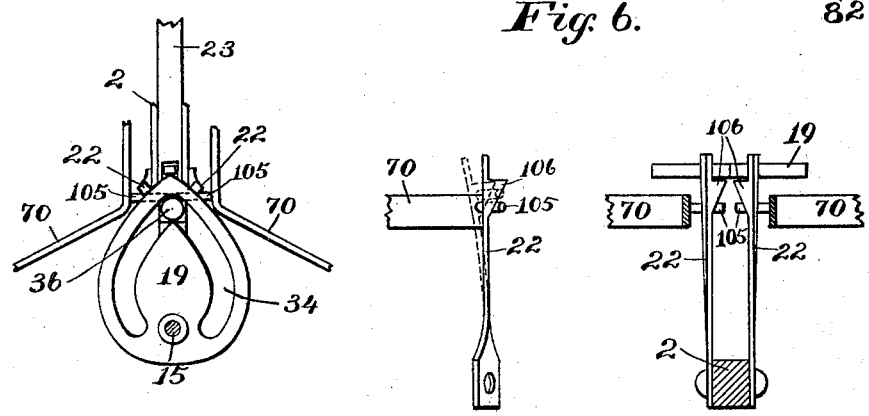

No. 718,929. PATENTED JAN. 20, 1903.
J. S. HARRISON & H. HILL.
TYPE WRITING MACHINE.
APPLICATION FILED APR. 12, 1902.
NO MODEL. 6 SHEETS—SHEET 6.
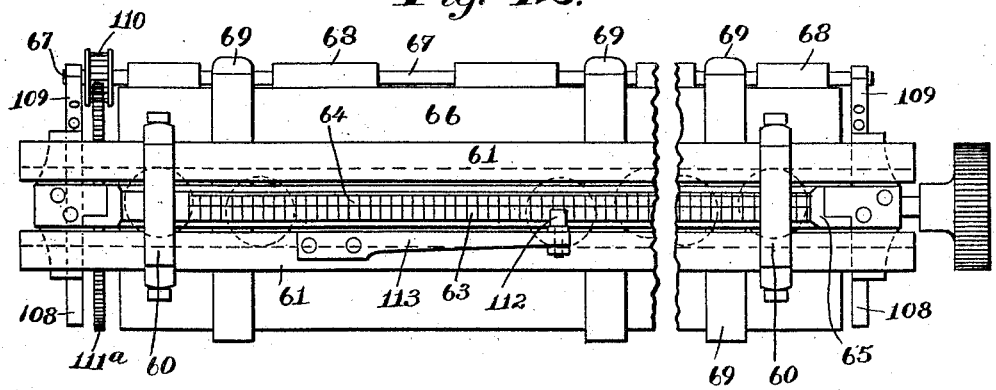
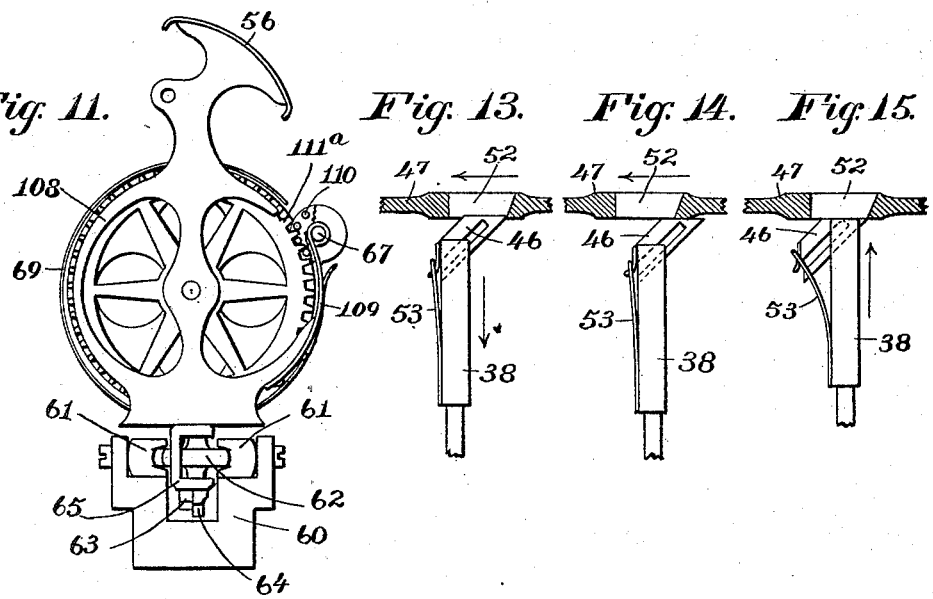
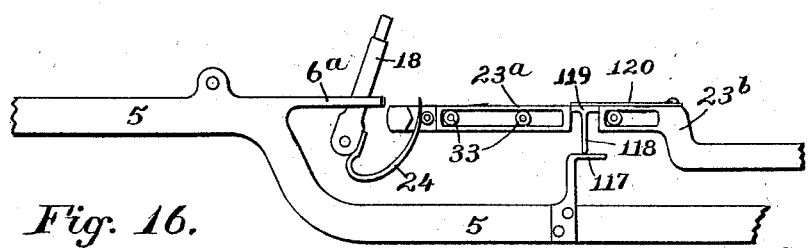

UNITED STATES PATENT OFFICE.

JOHN S. HARRISON AND HERMANN HILL, OF SAVANNAH, GEORGIA, ASSIGNORS, BY DIRECT AND MESNE ASSIGNMENTS, TO PRENDERGAST ELECTRIC TYPEWRITER COMPANY, A CORPORATION OF MAINE.

TYPE-WRITING MACHINE.

SPECIFICATION forming part of Letters Patent No. 718,929, dated January 20, 1903.

Application filed April 12, 1902. Serial No. 102,592. (No model.)

*To all whom it may concern:*

Be it known that we, JOHN S. HARRISON, a citizen of the United States, and HERMANN HILL, a subject of the Emperor of Austria-Hungary, both residents of the city of Savannah, Chatham county, State of Georgia, have invented certain new and useful Improvements in Type-Writing Machines, of which the following is a specification.

Our invention relates to type-writing machines, and more particularly to those machines in which a motor, such as an electromagnetic device, is employed to actuate the various mechanisms set in operation by the movement of the keys for effecting the printing of the characters upon the paper and the spacing of the letters and words, whereby the proper impressions are made upon the paper and at the proper time and in proper positions.

Our general object is to provide a machine of this type which shall be compact and comprise the fewest number of parts and having the most direct connections between the actuating-motor and the parts operated thereby and in which the movements will be effected in the simplest way with the least expenditure of energy both by the operator in operating the keys and by the motor in moving the parts designed to effect the movements of the impression devices and the paper-feed.

Our further object is to so construct the parts of the machine that they will be subjected to the minimum wear by reason of the simplicity of the movements and the small number of parts and the consequent minimum expenditure of energy in imparting the various movements to said parts.

A further object is to provide a machine in which, when operated by an electric or other motor of any type, all of the movements necessary to printing and spacing may be imparted by means of a single such motor and in which, therefore, but a single contact device is needed for all the movements initiated by the depression of the keys, and, finally, our object is to reduce to a minimum not only the noise incident to the operation of this class of machines, but lost motion between the parts and the consequent shock or jar to the parts.

With these general objects in view our invention consists generally in the provision of means for automatically operating any two or all of the printing elements comprising the type-wheel, hammer, and carriage through the medium of a movable element of an actuating-motor and controlled by the movement of any operating-key of the machine; in means for operating the type-wheel with differential movements while the movable element of the motor has a constant travel or moves a constant distance each time it is actuated by the motor, such means consisting of a yielding connection between the movable element of the motor and the type-wheel, and, further, in so constructing such yielding connection that it will cause a uniform force of vibration or rotation to be transmitted to the type-wheel from the movable element of the motor for every printing position of said type-wheel.

Our invention further consists in the provision of breaking or detaching devices controlled by the movement of a spacing bar or lever in the mechanisms connecting the hammer and the movable element of the motor, such breaking or detaching devices being operated by the spacing lever or bar to prevent the hammer from striking or moving when the carriage is moved by the motor for spacing, and in similar mechanism operated by similar means for preventing movement of the type-wheel.

Our invention further consists in the provision of link connections between each of the printing elements and the motor, whereby lost motion between the parts is obviated.

Our invention further consists in the novel construction and the details thereof, as hereinafter disclosed and more particularly defined in the claims.

Figure 2:
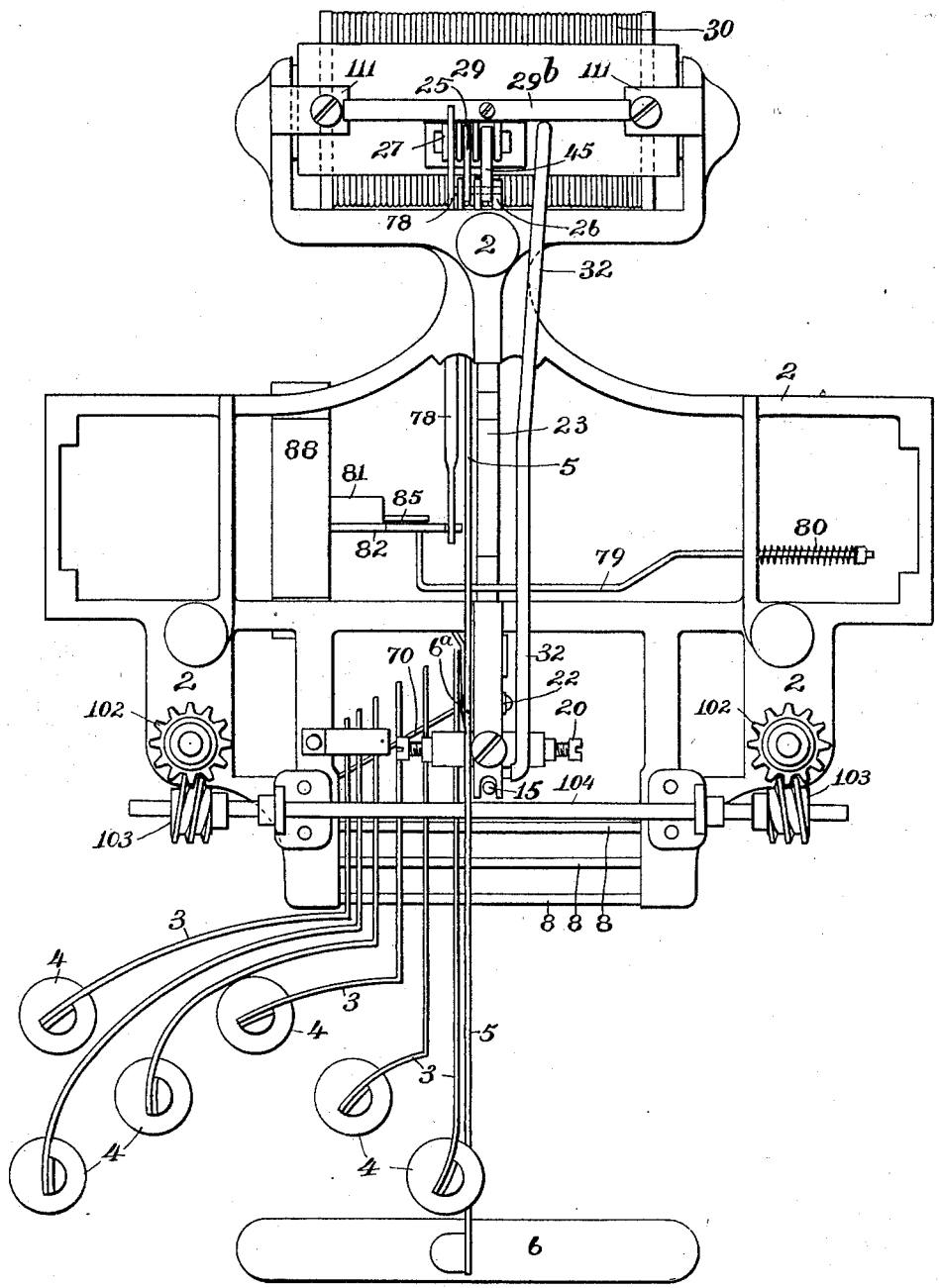

In the drawings, Figure 1 is a top plan view with certain parts removed for clearness. Fig. 2 is a bottom plan view. Fig. 3 is a central longitudinal sectional elevation looking to the left, Fig. 1. Fig. 4 is a similar view looking to the right. Figs. 5, 6, and 7 are front, rear, and sectional elevations, respectively, of the carriage-feeding device. Figs. 8, 9, and 10 are details of the type-wheel-operating mechanisms. Figs. 11 and 12 are end and bottom views of the platen and carriage. Figs. 13, 14, and 15 are details of different positions of the hammer, and Fig. 16 is a modification hereinafter referred to.

We have shown our invention applied to a type-wheel machine in which a rotatable part or wheel bears the characters which are adapted to be brought into printing position by the rotation of said wheel arrested by suitable stops at different points corresponding to the character to be printed; but it is to be understood that the term "type-wheel" as used in this description and claims includes any form of type-carrying structure wherein the characters are normally disposed at different distances on either side of the printing position and are brought into printing position by the movement of the type-carrying device varying distances according to the position of the character to be printed, and hence we have adopted the term "vibrating type-wheel" to mean a type-carrying device which has either a rotary or reciprocating motion, or a union of these two, imparted to it by the operating means in order to bring the character to be printed into printing position.

By the term "printing elements" we mean the type-wheel, impression device or hammer, and the carriage for holding and feeding the paper, which are the three fundamental elements in machines of this type set in operation by the operating-keys.

Referring to the drawings, in which the same reference characters relate to the same or corresponding parts in all the views, the numeral 1 indicates the base-board of the machine, to which the supporting-frame 2 is preferably suitably clamped by any of the clamps in common use, whereby it is readily removable therefrom.

The key-levers 3, provided with keys 4, are fulcrumed in three banks upon fulcrum-rods 8, carried by brackets 7, fixed to the frame 2 of the machine, the keyboard being preferably divided into two parts, the operating devices and connections for each half of the machine being the same. In the drawings several of the keys are omitted for the sake of clearness in illustration.

We will now describe the various printing elements in the order in which they come into action, beginning with the type-wheel structure and operating mechanism.

*Type-wheel structure.*—Mounted upon the main frame 2 of the machine is a type-wheel-supporting structure comprising upper and lower plates 9, supported by hollow standards 10$^a$, rising from the said main frame. Confined between the upper and lower plates 9 is a vertical sleeve 10, through which passes a hollow shaft 11, to the upper end of which latter is fixed the type-wheel arm 12, moved by said shaft 11 as the latter is rotated or vibrated. The type-wheel 14, bearing the characters 16, facing to the rear, is connected to the type-wheel arm 12 by means of a pin 13, projecting upwardly from the rear end of said arm into a socket or bore in said type-wheel, such connection confining the type-wheel against independent rotary or vibrating movement with respect to the arm 12, but permitting vertical movement, whereby as the latter swings around its pivotal point the type-wheel is caused to move therewith, but is free to rise vertically with respect thereto when it is desired to shift from upper to lower case or other characters on the type-wheel. An inclosing guard 35 surrounds the type-wheel and is divided at the printing-point and presents a straight surface 35$^a$ on either side of the opening thus formed, against which the ribbon-guard or ribbon bears, as usual in machines of this type, but not shown in the drawings.

The shifting of the type-wheel vertically may be accomplished in any of the well-known ways through the medium of a vertical rod 15, passing through the shaft 11 and connected to any suitable mechanism for imparting rising-and-falling movement thereto, not deemed necessary to show in the drawings, as the same forms no part of our invention.

In order to stop the type-wheel at the proper point for printing the letter corresponding to the key, we have shown a common form of stop-pin for the several keys, consisting of rods 17, slidably mounted in the upper and lower frames 9, the upper ends of said pins resting normally below the lower surface of the arm 12, in which position they are held by suitable springs bearing between collars on the pins and the upper frame 9. The lower ends of these rods bear upon the corresponding key-lever, so that when the latter is depressed the corresponding pin will be raised, thereby projecting the upper end into the path of the arm 12 to stop the same, and hence the type-wheel, in the proper position for the character intended to be printed.

In order to impart the vibrating or swinging movement to the type-wheel at the proper time, we provide a simple system of link connections between the operating-motor and the shaft 11, and one of the essential features of this type-wheel-operating mechanism consists in the provision of yielding connection between the type-wheel and the motor. The purpose of this is to provide for the differential movement of the type-wheel with respect to the constant movement of that movable element of the motor with which the type-wheel-operating mechanism is connected—in the instance shown the armature of the magnet 30.

As the type-wheel moves a varying distance from its normal position of rest to the right or left of the printing position in order to bring the various characters into said printing position and as the movable element of the actuating-motor has a constant travel, and hence moves a constant distance, any rigid connection between the type-wheel and the movable element might seriously interfere with the operation of the machine; but by using the yielding connection between these two parts the difference in movements between the type-wheel and the armature is so effectually compensated that differential movements of the type-wheel with respect to the constant travel of the movable element are obtained, the yielding connection offering sufficient resistance for every movement of the type-wheel to secure the proper extent of vibration thereof for every character.

In the form shown in the drawings we mount upon the hollow shaft 11 a heart-shaped cam 19, provided with a slot or groove 34, in which engages a roller 36, carried by the upper end of the rock-shaft 18. The rock-shaft 18 is journaled in suitable bearings 21 on the fixed frame, through which pass adjusting-screws 20, having their points bearing upon each end of the trunnions of the rock-shaft, so that accurate adjustment of the rock-shaft may be readily secured and maintained with respect to the central line of the machine and with respect to the heart-shaped cam, the normal position of said rock-shaft being in a vertical plane and inclined to the rear, as shown in Fig. 3. Fixed to the rock-shaft is a spring 24, having its free end in engagement with a slot or recess in a link 23, guided by a roller 33, working in a slot in said lever and mounted on a stud fixed to the frame 33$^a$. The rear end of this link is connected to a bell-crank 25, fulcrumed on the fixed frame of the machine at 26, the short arm of which bell-crank engages a pin 28, carried by depending hangers 27 on the armature 29 of the magnet 30, the latter being held between standards 77, attached to the frame 2. These elements constitute a link connection between the movable element of the motor and the type-wheel, the spring forming the yielding element thereof. The armature 29 is preferably connected by a long link 32, fulcrumed on the frame of the machine at a considerable distance from the armature, whereby simple provision is made for causing the armature to move in a substantially vertical direction between stops 111 and the pole-pieces 31 of the magnet as the latter is energized. A suitable spring 29$^b$, engaging each of the stops 111 and fixed to the armature, normally holds the latter down against the stops and assists to positively return the armature when the circuit is broken. The armature 29 is preferably provided with widely-separated contact-points 29$^a$ of limited area, whereby when the armature is attracted to the pole-pieces the contact-points 29$^a$ strike the latter with less noise than would be the case where the surface of contact is of greater area, and hence noise is reduced to a minimum. The downward movement of the armature is arrested by stops 111, extending from the fixed structure into the path of the magnet.

In order to energize the magnet so as to cause the armature to move upwardly into contact with the pole-pieces 31, we provide a pivoted contact-bar 70, fulcrumed upon lugs 70$^a$ on the frame 2, said bar extending across and in contact with the key-levers 3 and being normally held in contact therewith by a spring 71. We have shown in the drawings one of these contact-bars, the construction thereof being the same on each side of the machine.

Fixed to the outer arm of the bar 70 is a contact-point 73, held between clamping-plates secured by screws to a non-conducting arm 72, attached to the bar 70 by any suitable means, such as the set-screws shown, and in contact with said point 73 is one end of a wire 74 of an electric circuit, conventionally shown as including a battery B, from one pole of which passes the wire 75, connecting the coils of the magnet 30, the other end of the wire 76 connected to the non-magnetic metallic supporting-posts 77, such as brass, of the magnet, which are mounted directly upon the metallic frame 2 of the machine. Where the current used requires a suitable rheostat, the same may be inserted at the proper point in circuit, as understood by those skilled in the art—as, for example, where the current used is derived from a lighting-circuit.

Mounted upon the frame 2 of the machine to one side of the contact-bar 70 is a contact piece or plate 100, having its upper end bent so as to overhang the point 73, such upper bent portion being preferably provided with a platinum contact-plate 101. (See Fig. 4.) The contact-piece 100 forms the fixed contact element of the circuit-closing device in circuit with the electric motor, while the contact-bar 70, carrying its pins 73, forms the movable element thereof.

By pressing down upon any key it will be observed that the end of the key-lever 3 in the rear of the fulcrum 8 will raise the contact-bar 70, thereby bringing the contact-point 73 in contact with the plate 101 and closing the circuit through the wire 74, the frame of the machine, the motor or magnet, the wire 75, and the battery B, and instantly thereupon the armature 29 is attracted to the pole-pieces 31, moving the short end of the bell-crank 25 upwardly and throwing the link 23 forward, which, through the yielding connection 24, rocks the shaft 18 upon its bearings, and in so rocking the shaft, as the latter must swing in a vertical plane, the roller 36 moves forwardly in a straight line, thereby throwing the cam 19 to one side or the other from its normal central position. This movement of the cam is imparted to the type-wheel through the medium of the hollow shaft 11 and the arm 12. A branch wire 74$^a$ leads to a contact-bar similar to the bar 70 on the other side of the machine, the circuit-closing device being the same on both sides of the machine.

In order to insure the movement of the cam in the right direction to shift the type-wheel so as to bring the proper letter to printing position, we provide means dependent upon and controlled by the movement of the key-lever to throw the cam slightly to one side or the other of its central position, and thus shifting the roller 36 to one side or the other of the point of the cam groove or slot 34. As a convenient means for effecting this purpose we have shown (see Figs. 3, 8, 9, and 10) springs 22, fixed to the frame 2 and projecting upwardly on each side of the point of the cam and normally in contact therewith, as shown in Figs. 1, 3, 8, and 9. These springs are provided with beveled lugs 106, which are adapted to be engaged by studs 105, projecting from the contact-bar 70, so that as the latter is raised upon the movement or depression of a key the stud 105 moves upwardly into contact with the beveled face of the lug 106, thereby forcing the said spring out of engagement with that side of the cam on which the moving contact-bar is located, as shown in Fig. 9. This removal of said spring permits the spring on the opposite side, adjusted to exert a light pressure, to throw the cam slightly to one side of the central position, thus insuring the operation of the roller 36 upon the proper side of the cam to effect that movement of the cam corresponding to the character on the key depressed or moved.

Simultaneously with the lifting of the contact-bar by the movement of the key-lever it will be understood that the stop-pin 17 corresponding to said lever is lifted to throw its upper end above the upper surface of the frame 9 and in the path with the arm 12, so that when the type-wheel cam moves the type-wheel in the manner hereinbefore described said arm 12 will be stopped by said pin, thereby arresting the type-wheel at different points corresponding to the character to be printed.

It will be observed that the spring 24, constituting the yielding connection between the lever 23 and the rock-shaft 18, tapers from its free end to the point of attachment with the rock-shaft arm. When the type-wheel is to be moved the least distance from its normal position, the rock-shaft arm 18 moves its least distance, and consequently as the link 23 moves its constant distance the tapered end of the spring will be bent its maximum extent. When the type-wheel is to be moved its greatest distance to bring the character at the extreme outer edge of the type-plate to the printing-point, the rock-shaft will move its greatest distance, and consequently the spring carried by the said shaft will slide through the slot in the lever its greatest extent, and hence there will be less bending of the spring and less resistance due to such bending, which diminution in resistance from such cause is counteracted by the increased resistance offered by the thicker portion of the spring presented to the moving lever or by the increased pressure offered to the bending as the point of pressure upon the spring approaches the fixed end. Such counteracting forces practically balance each other, one increasing as the other decreases, thereby maintaining a practically uniform resistance throughout the movement of the link. As a result of this construction, therefore, a substantially uniform force or pressure is transmitted by the link connection from the motor to the type-wheel for every printing position in which the type-wheel is arrested by the stops, thereby rendering certain the arrest of the type-wheel at the printing position corresponding to the character on the key which is moved.

*Hammer-operating mechanism.*—As soon as the type-wheel is moved to printing position and almost immediately after the completion of such movement, the hammer 48 delivers its blow, such being accomplished by the mechanism now to be described.

Fixed to or forming part of the frame 2 of the machine is a hollow casting 37, in the upper portion of which is a horizontal chamber or bore, in which the hammer bar or stem 47, carrying the hammer 48, is adapted to reciprocate. This hammer-stem 47 is provided with a vertical slot 52, through which the hammer-operating rod 38, vertically guided in a vertical bore or chamber of the casting 37, is adapted to move.

Confined between a collar 55 on the rod 47 and fixed part on the casting, such as an adjusting-nut 51, is a hammer-operating spring 49, adapted to be compressed when the hammer is loaded or drawn back just previously to delivering its blow and when released to cause the hammer to move quickly forward. Between said collar and forward wall of the chamber in which the same is confined is a buffer-spring 50, adapted to cause a slight rebound of the hammer as soon as the blow is delivered. The nut 51 adjusts the tension on the spring 49 to increase or diminish the force of the hammer-blow.

The hammer-operating rod 38 is connected to the armature through the medium of the pivoted catch 39, having a notched end 40 in engagement with a detent on the upper end of the link 42. The link 42 is normally held in vertical position to cause its detent to lock in the notch on the catch 39 by a spring 43, attached to the lever 44 and bearing against the flat lower end of the link 42, which is pivotally supported upon the front end of the lever 44, the latter fulcrumed upon the pin 26 and engaging with the pin 28 on the armature.

Slidably mounted in an inclined slot or suitable guideway 46ᵃ on the upper end of the rod 38 is a tripping cam-slide 46, normally held in extreme upper position, as shown in Fig. 3, by a suitable spring, such as a leaf-spring 53, attached to the rod 38, with the free end in engagement with said tripping cam-slide 46.

In a chamber in the lower end of the vertical bore of the casting 37 is a spring 54, confined between a shoulder on the rod 38 and the lower end of said chamber, said spring normally tending to press the rod upwardly, thereby projecting its upper end through the slot 52.

Upon the upward movement of the armature in the manner hereinbefore indicated the arm 45 of the lever 44, connected to the pin 28, moves upwardly, thereby throwing its forward arm downwardly, thus pulling the rod 38 downward and compressing the spring 54. The rear inclined edge of the tripping cam - slide 46, acting upon the rear end of the slot 52 in the hammer bar or stem 47, presses the said hammer - bar rearwardly against the action of the spring 49, whereby such downward movement of the rod 38 loads the hammer for delivering its blow. (See Fig. 13.) Continued downward movement of the rod 38 finally carries the upper edge of the tripping cam-slide 46 below the bottom of the slot 52, and the instant said upper edge is disengaged from said slot the hammer-stem 47 is released, and the spring 49 expanding causes the hammer to deliver its blow. (See Fig. 13.) Immediately upon release of the key the circuit is of course broken, and the armature being thereby released drops by gravity and in the preferable construction by the aid of a spring $29^b$, thereby permitting the spring 54 to exert its force upwardly against the shoulder on the rod 38, and the consequent upward movement of the rod 38 causes the tripping-cam slide 46 to slide downward in its guideway, which is now in engagement with the lower face of the bar 47, and as the rod 38 continues its upward movement under the influence of the spring 54 the tripping-cam slide 46, being free to slide, is caused to further move downwardly until the extreme rear edge of the tripping cam-slide comes within the rear wall of the slot 52 on the bar 47, thereby permitting the spring 54 to project the rod 38 and the tripping-cam 46, carried thereby, through the slot in the hammer-bar. The spring 53 having had the proper tension imparted to it by the downward movement of the slide now exerts pressure against the front end of the tripping-cam and causes the latter to resume its normal position, as shown in Fig. 3.

*Carriage and carriage-feed.*—The paper-cylinder 66, covered with a yielding material, such as rubber, is mounted on a spindle 107, journaled in end frames 108, attached to the carriage 65, and suitable guides 69, extending from the carriage, encircle the cylinder, and against the surface of the cylinder a feed-pressure roll 68 of yielding material bears with frictional contact throughout the length of the cylinder. This roll is journaled on a spindle 67, having bearings in springs 109, attached to the frame 108. One end of the spindle 67 is provided with a pinion 110, meshing with a spur-gear $111^a$ on the spindle or shaft 107, whereby positive motion is imparted to the spindle 67 upon the rotation of the cylinder for line-spacing or when it is desired to move the paper by the rotation of the cylinder through the medium of the hand-wheel commonly employed on the spindle for any purpose—for example, to bring any particular line upon the erasing-tablet 56, extending across the top of the cylinder. The ribbon-spools (not shown) are mounted, as usual in this type of machines, upon spindles passing upwardly through the hollow standards $10^a$, one on each side, and are operated by spur-gears 102, meshing with worms 103 on a driving-shaft 104, the latter operated by any suitable connection with a moving part of the machine.

The carriage 65 is slidably mounted in guides 61, carried by brackets 60, fixed to the frame 2, said carriage being preferably in the form of U-bar, between the upper and lower flanges of which are rollers 62, mounted in suitable antifriction-bearings, the peripheries of said rolls being confined to travel in grooves in the guides 61.

Projecting from the bottom flange of the carriage 65 are two rack-bars 63 and 64, the former preferably having curved teeth adapted to be engaged by a roll 112, yieldingly held in contact with said teeth by a spring 113, fixed to one of the guides 61, on which spring said roll is supported. The purpose of this rack-bar and its coöperating roll or pawl is to check the carriage as it is intermittently moved, so as to prevent it from being moved more than one tooth or the proper space at each operation of the carriage-feeding mechanism.

The carriage-feeding mechanism is best seen by reference to Figs. 1, 3, 4, 5, 6, and 7, where the rack-bar 64 is shown extending downwardly from the carriage 61, with which bar the pawl 87 is adapted to engage. The pawl 87 is in the form of a plate having a tooth formed to engage with the tooth of the rack-bar 64 and is slidably mounted in guideways in a horizontal slide 86, adapted to reciprocate in a slideway in a plate 81, fixed to the frame 2 of the machine. A pin 99 projects from the slide 86 into a slot 98 in the pawl to limit the extent of its movement. The slide 86 is held in frictional contact with its supporting-plate 81 by a frictional device, consisting in the present instance of a spring 90, (see Fig. 7,) confined between a collar 94 on a stud 89 and a bearing plate or collar 92, which stud projects from the plate 86 through an elongated slot 93 in the plate 81. The pawl is so mounted in a diagonal guideway in the plate 86 that the frictional resistance between the two shall be appreciably less than that between the plate 86 and its guiding and supporting plate 81, whereby when a pull is exerted upon the pawl in a horizontal direction it will first move in its guideway, thereby causing the tooth of said pawl to advance into engagement with a tooth on the rack-bar 64, and further force in the same direction will cause both pawl and the slide 86 to move in the direction of pull, and consequently effect the movement of the carriage one tooth or the proper space. This difference in frictional resistance between the two parts reduces to a minimum the force necessary to set the pawl in position to effect the actual motion of translation of the carriage.

In order to set the pawl in the manner above noted, by means of the motor, a link 85, pivoted at 91 to the pawl, connects the latter to a bell-crank 84, fulcrumed at 96 on an extension 95 on the fixed plate 81. The short arm of said bell-crank has a pointed end $84^a$, bearing in a recess in a lever 82, fulcrumed at $82^a$ to the fixed plate 81. This lever has an offset portion around the short arm of the bell-crank 85, from which offset portion extends a pin 83 in line with the fulcrum $82^a$, which pin is engaged by the forked end of a lever 78, fulcrumed at 97 and having its other end engaging the pin 28, carried by the armature 29. Movement of the armature upon the depression of a key, as hereinbefore described, throws the forward forked end of the lever 78 downward, thereby depressing the lever 82 downward and likewise lowering the pointed end $84^a$ of the lever 84, thereby causing the link 85 to push the pawl downward in its slideway on the slide 86, and continued downward movement of the lever 82 moves the pawl and slide backward to a position for the next advance movement of the pawl. The bell-crank 84 is connected to a rod 79, passing through a guiding hole or slot on the frame 2 and having a helical spring 80 at its outer end bearing against a collar on said rod and against the frame. Upon the depression of the lever 82 this spring, which is under compression, is further compressed on the movement of the rod 79 by the bell-crank 84 when the latter sets the pawl, as above described, and hence the moment the key-lever is released, the circuit broken, and the armature returns to its inactive position the first effect of the consequent reverse movement of the lever 82—that is, upwardly—is to cause the pawl to slide upwardly on the slide 86 and engage the tooth of the bar 64, as shown in Fig. 5. The spring 80 being now free to exert its full force, pulls the lever 84, the pawl 87, and slide 86 horizontally the distance required to move the carriage one tooth or proper space. The action of the feeding pawl or dog 87 is thus seen to embody a four-cycle motion, for when the lever 82 is depressed by the link connection between it and the armature as the latter rises when the circuit is closed by the movement of the key 3 the first motion is a diagonally-downward motion of the pawl in its guide on the plate 86, disengaging the tooth from the rack-bar 64, and the final downward motion of the lever 82 causes the pawl to move with the plate 86 bodily backward into position under the next tooth of the rack 64, and while such movements are taking place the type-wheel has been brought to printing position and the hammer then delivers its blow. Then immediately upon the breaking of the circuit the armature falls, during the first part of which falling movement of the armature the pawl is pulled upwardly into engagement with the rack 64, and the spring 80, exerting its pull upon the lever 84, positively pulls the pawl and the plate 86 horizontally forward, thereby imparting a positive feeding movement to the carriage, the latter not being connected directly with any spring or like device. Simultaneously with the completion of the return downward movement of the armature the spring 80 completes its pulling of the pawl 87 to the left, and the lever 82 is then in its normal position, where no further force can be imparted to the pawl by the spring.

It will be observed that all the movements of the printing elements are caused to follow immediately one after the other, because the levers, connected to the armature, and each forming an element of the link connections between the armature and the printing elements, are so fulcrumed and connected to the appurtenant element that the necessary sequence of operation is attained, although the setting in operation of the several link connections by the armature are practically synchronous. Near the limit of this movement the power of the spring 80 of course decreases; but the impetus given to the carriage by reason of the ease with which it is adapted to move may tend to impart a greater extent of movement than that desired, and in order to prevent this result the roll 112 on the spring-pawl 113 slips into engagement with a tooth on the bar 63, the pressure being sufficient to check the movement of the carriage due to the momentum, but not sufficient to interfere with the direct and positive movement of said carriage by the pawl 87 when the latter is under the action of the spring 80 during the necessary part of the carriage movement to shift the same a sufficient distance for the spacing, such pawl 112 holding the carriage until the next operation of the pawl 87.

The line-spacing devices are not shown, as they may be of any well-known type of pawl-and-ratchet mechanism, nor is it deemed necessary to show the carriage-shifting lever for returning the carriage at the completion of a line, such shifting-lever being of any known type and forming no part of our present invention. It may be noted, however, in this connection that as the normal position of the pawl 87 (see Fig. 5) would ordinarily prevent shifting the carriage to the right it is only necessary to touch the space-bar as the carriage is shifted, whereby the first or downward movement of the dog is effected by the motor and permits the shifting of the carriage.

In order to move the carriage for word-spacing, the spacing-bar 6 on the end of the spacing-lever 5 is depressed, and this movement of the spacing-lever raises the contact-bar 70, through the medium of an extension $6^a$, engaging said contact-bar, and effects the movement of the armature 29 in a similar manner to that effected by the key-levers. At such times, however, the hammer mechanism must be rendered inoperative in order to avoid an impression upon the paper. To accomplish this purpose, the spacing-lever 5 is extended to the rear, where it engages the forked end of a horizontal arm 58 of a bell-crank lever fulcrumed at 59. The vertical arm 57, beveled at its upper end, is normally out of engagement with the arm 41, having a corresponding beveled end on the bell-crank 39, carried by the hammer-operating rod. When the spacing-bar is depressed, therefore, the rear end of the spacing-lever moves the arm 58 upwardly, thereby throwing the beveled end of the arm 57 into contact with and raising the arm 41 of the bell-crank 39, which movement disengages the notch 40 from the arm 42, thereby breaking the connection between the rod 38 and the armature. The movement of the armature at this time shifts the carriage, through the medium of the carriage-operating lever 78 and its coöperating parts, in the manner above described, and when the armature returns to its normal inactive position the lever 44 moves the rod 42 upwardly until its detent end slips into engagement with the notch end 40 of the bell-crank 39, thus restoring the hammer mechanism to its normal position. The type-wheel mechanism will of course operate during such spacing; but we may provide that mechanism with similar devices for breaking the connections between the type-wheel and the armature or movable element of the motor. Such a device is shown in Fig. 16, where the spacing-lever is provided with a push-plate 117, engaging a downwardly-projecting stem 118 on a sectional coupling strip or block 119, normally interposed between two sections 23$^a$ and 23$^b$, constituting the connecting-link 23. This block is carried by a leaf-spring 120, attached to the rear section of 23$^b$ of the lever, the other parts of the type-wheel-operating mechanism being the same as heretofore described. Upon the movement or depression of the space-bar the push-plate 117 pushes upwardly against the stem 118, thereby raising the coupling block or strip out of the space between the two sections of the lever 23, and breaks connection between the type-wheel and the motor, thus permitting movement of the rear section with respect to the front section of the link and preventing at such times the operation of the type-wheel. When the spacing-lever is released, it resumes its normal position, the motor drawing the rear section 23$^b$ back, and the spring 120 forces the coupling-block down between the sections 23$^a$ and 23$^b$.

We do not claim herein the specific construction of hammer and its operating parts, nor do we claim the specific construction of carriage and feeding devices, as these improvements constitute the sole invention of Hermann Hill and are claimed in applications filed by him, respectively, April 12, 1902, Serial No. 102,594, and April 14, 1902, Serial No. 102,801.

It is obvious that any one or more of the printing elements of a type-wheel or like machine may be operated by the motor and its connecting elements, although it is preferable to operate all three by such means, and when any one or two of such elements are so operated the remaining element or elements may be operated by the usual operating means.

By "link connection" as used in this specification it is to be understood that we mean such a connection as will transmit motion from the motor to the printing elements without lost motion as distinguished from such connections as embody devices in which is necessarily lost motion between some of its parts before the movement of the movable element of the motor transmits the motion required to fully perform the function of the particular printing element or elements. We do not, however, in this application claim, broadly, the feature of the link connection between the type-wheel and the movable element of the motor, nor the said link connection having a yielding element therein, as these generic features are the sole invention of John S. Harrison and are claimed by him in an application filed concurrently herewith.

We claim as our invention—

1. In a type-writing machine, the combination with the printing elements and the key-levers, of a motor for actuating the printing elements having an intermittently-operated movable element, and continuous connections between the said movable element and all of the printing elements controlled by the movement of any key-lever for actuating the printing elements for printing and spacing of the characters, substantially as described.

2. In a type-writing machine having key-levers, the combination with a type-wheel bearing the characters, an impression device, and a carriage, of a motor having an intermittently-operated movable element, connections between said movable element and the type-wheel and impression device and the carriage, and mechanism operated by the movement of each key to cause said movable element to operate all of said connections, whereby upon the movement of any key the type-wheel is brought to printing position, the impression device operated to print the character, and the carriage shifted for the next printing operation, substantially as described.

3. In a type-writing machine having key-levers, the combination of an impression device and a carriage, an intermittently-operated motor having a movable element, continuous connections between the movable element, the impression device and the carriage, and mechanism operated by the depression of any key to cause said movable element to operate both of said connections, whereby upon the movement of any key-lever, the impression device and the carriage are operated, substantially as described.

4. In a type-writing machine having key-levers, the combination with a type-wheel and a carriage, of a motor having an intermittently-operated movable element, connections between said movable element and the said type-wheel and carriage, and mechanism operated by the movement of any key-lever to cause said movable element to operate both of said connections, whereby upon the movement of any key-lever the type-wheel is moved to printing position and the carriage shifted by said movable element, substantially as described.

5. In a type-writing machine having key-levers, the combination with a type-wheel and impression device, of a motor having an intermittently-operated movable element, connections between said movable element and the type-wheel, connections between the movable element and the impression device, means for shifting the carriage and mechanism controlled by the movement of the key-levers for causing said movable element to operate both of the said connections, whereby upon the movement of any key-lever the type-wheel is moved to printing position and the impression device operated, substantially as described.

6. In a type-writing machine having key-levers, the combination with a type-wheel, an impression device and a carriage, of a motor having an intermittently-operated movable element, independent connections between the movable element and each of the said printing elements, and mechanism operated by the movement of any key-lever to cause each of said connections to operate its appurtenant element, whereby upon the movement of any key the movable element is caused to operate the type-wheel, impression device and carriage, substantially as described.

7. In a type-writing machine having key-levers, type-wheel, impression device and carriage, the combination of a motor having a movable element, a link connection between the movable element and the type-wheel, a link connection between said movable element and impression device, and a link connection between said movable element and the carriage, with means controlled by the movement of any key-lever for causing the movable element of the motor to actuate the said link connections, whereby upon the movement of any key-lever the movable element of the motor will actuate the type-wheel, impression device and the carriage, substantially as described.

8. In a type-writing machine having key-levers, the combination with the type-wheel and impression device, of a motor having a movable element, a link connection between the movable element and the type-wheel, and a link connection between the movable element and the impression device, with means controlled by the movement of any key-lever for causing the movable element of the motor to actuate said link connections, whereby upon the movement of any key-lever the movable element of the motor will actuate the type-wheel and the impression device, substantially as described.

9. In a type-writing machine having key-levers, the combination with the type-wheel and carriage, of a motor having a movable element, a link connection between the movable element and the type-wheel, and a link connection between said movable element and the carriage, with means controlled by the movement of any key-lever for causing the movable element of the motor to actuate said link connections, whereby upon the movement of a key-lever the type-wheel and carriage are actuated by the movable element of the motor, substantially as described.

10. In a type-writing machine having key-levers, the combination with the impression device and the carriage, of a motor having a movable element, a link connection between the movable element and the impression device adapted to directly and positively move said impression device, and a link connection between the movable element and the carriage adapted to directly and positively move the carriage, with means controlled by the movement of any key-lever for causing the movable element of the motor to actuate said link connections, whereby upon movement of a key-lever the impression device and carriage are actuated by the movable element, substantially as described.

11. In a type-writing machine having key-levers, the combination with the printing elements comprising a type-wheel, an impression device and a carriage, of a motor having a movable element, a series of levers connected to the movable element, independent connections between said levers and each of the printing elements, and means controlled by the movement of any key-lever for causing the movable element to actuate all of said levers, substantially as described.

12. In a type-writing machine having key-levers, the combination with two of the printing elements comprising a type-wheel and an impression device, of a motor having a movable element, independent levers connected to said movable element, independent connections between said levers and each of the printing elements, and means controlled by the movement of any key-lever for causing the movable element to actuate all of said levers, substantially as described.

13. In a type-writing machine having key-levers, the combination with two printing elements comprising a type-wheel and a carriage, of a motor having a movable element, independent levers connected to said movable element, independent connections between said levers and each of the printing elements, and means controlled by the movement of any key-lever for causing the movable element to actuate all of said levers, substantially as described.

14. In a type-writing machine having key-levers, the combination with two printing elements comprising an impression device and a carriage, of a motor having a movable element, independent levers connected to said movable element, independent continuous connections between said levers and each of said printing elements, and means controlled by the movement of any key-lever for causing the movable element to actuate all of said levers, substantially as described.

15. In a type-writing machine having key-levers, a vibrating type-wheel bearing characters adapted to be brought to printing position by the vibration of said type-wheel, a carriage, a motor having a movable element, a connection between said movable element and the carriage, a yielding connection between the movable element and the type-wheel, and means controlled by the movement of any key-lever for causing the movable element to actuate the type-wheel and the carriage, substantially as described.

16. In a type-writing machine having key-levers, a vibrating type-wheel bearing characters adapted to be brought into printing position by the vibration of said type-wheel, an impression device, means for arresting the type-wheel at different points corresponding to the characters to be printed, a motor having a movable element with constant travel, a yielding connection between said movable element and the type-wheel and adapted to permit a differential movement of the type-wheel with respect to the travel of the movable element of the motor, a connection between the impression device and the movable element, and means operated by the movement of any key-lever for causing the movable element to actuate the type-wheel and the impression device, substantially as described.

17. In a type-writing machine having key-levers, a type-wheel bearing characters adapted to be brought into printing position by the vibration of the type-wheel, stops for arresting the type-wheel at different points corresponding to the character to be printed, an impression device, a motor having a movable element with constant travel, a link connection between said movable element and the type-wheel for vibrating the same, a yielding element forming part of said link connection, a link connection between the impression device and the movable element, and means controlled by the movement of any key-lever for causing the movable element of the motor to actuate the type-wheel and the impression device, substantially as described.

18. In a type-writing machine having key-levers, a vibrating type-wheel bearing characters adapted to be brought into printing position by the vibration of the type-wheel, stops for arresting the type-wheel at different points corresponding to the character to be printed, a motor having a movable element with constant travel, mechanism connecting said movable element with the type-wheel for vibrating the same, a yielding element in said mechanism constructed to transmit a substantially uniform force of vibration to the type-wheel for every printing position of the same, and means controlled by the movement of any key-lever for imparting motion to the movable element of the motor, substantially as described.

19. In a type-writing machine having key-levers, a vibrating type-wheel bearing characters adapted to be brought into printing position by the vibration of said type-wheel, stops for arresting the type-wheel at different points corresponding to the character to be printed, an impression device, a motor having a movable element with constant travel, a link connection between said movable element and the type-wheel, a spring forming a part of said link connection and adapted to transmit differential movement to the type-wheel for its various printing positions, a link connection between the impression device and the movable element, and means controlled by the movement of any key for imparting motion to said movable element, substantially as described.

20. In a type-writing machine having key-levers, a vibrating type-wheel bearing characters adapted to be brought into printing position by the vibration of the type-wheel, stops for arresting the type-wheel at different points corresponding to the character to be printed, a motor having a movable element with constant travel, a link connection between said movable element and the type-wheel, a spring forming a part of said link connection constructed to transmit a substantially uniform force of vibration to the type-wheel for every printing position and to permit differential movement of the type-wheel with respect to the travel of the movable element of the motor, and means controlled by the movement of the key-levers for imparting motion to the said movable element, substantially as described.

21. In a type-writing machine having key-levers, a vibrating type-wheel bearing characters adapted to be brought into printing position by the vibration of the type-wheel, stops for arresting the type-wheel at different points corresponding to the character to be printed, a motor having a movable element, a link connected to, and interposed between, said movable element and the type-wheel, a tapered spring having its thin end freely engaging said link and its thick end connected with the type-wheel, and means for causing the movable element of the motor to impart motion to the link upon movement of any key-lever, substantially as described.

22. In a type-writing machine having key-levers, a vibrating type-wheel bearing characters adapted to be brought into printing position by the vibration of the type-wheel, stops for arresting the type-wheel at different points corresponding to the character to be printed, a motor having a movable element, a rock-shaft connected to the type-wheel for vibrating the same, a link connected to, and interposed between, said movable element and the type-wheel, a tapered spring having its thin end slidably engaging the link and its thick end attached to the rock-shaft, whereby differential movement of the type-wheel in respect to the movable element is permitted and a substantially uniform force is transmitted to vibrate the type-wheel, and means controlled by the movement of the key-levers for causing the motor to operate, substantially as described.

23. In a type-writing machine having impression mechanism including a hammer, a carriage and feed device therefor, a spacing-lever, a motor having a movable element, connections between said movable element and the hammer, connections between said movable element and carriage-feeding device, means controlled by the movement of the spacing-lever for operating the motor, and a breaking device operated by the movement of the spacing-lever for breaking the connections between the hammer and movable element of the motor when the carriage-feed is operated thereby, substantially as described.

24. In a type-writing machine having printing elements comprising a type-wheel and a carriage and a feed device therefor, a motor having a movable element, connections between the type-wheel and the said movable element, connections between the movable element and the carriage-feed device, a spacing-lever, means controlled by the movement of said spacing-lever for operating the motor, and a breaking device operated by the said movement of the spacing-lever for breaking the connections between the type-wheel and the movable element when the carriage is operated thereby, substantially as described.

25. In a type-writing machine having printing elements comprising a type-wheel, a carriage and feed device therefor, and a hammer, a motor having a movable element, independent connections between the movable element and each of the printing elements, a spacing-lever, means controlled by the movement of the spacing-lever for operating the motor, and breaking devices operated by the said movement of the spacing-lever for breaking the connections between the movable element and the type-wheel and hammer, whereby when the carriage-feed is operated by the motor the type-wheel and the hammer are prevented from moving, substantially as described.

26. In an electrically-operated type-writing machine having movable keys, the combination with printing elements comprising a type-wheel, a hammer and a carriage, of an electric motor having a movable element, link connections between said movable element and each of said printing elements, a circuit-closing device in circuit with the motor operated by the movement of any key to close the circuit through the motor and thereby cause the movable element of said motor to operate all the printing elements, substantially as described.

27. In an electrically-operated type-writing machine having key-levers, the combination with printing elements comprising a type-wheel, a hammer and a carriage, of an electric motor having a movable element, link connections between said movable element and each of the printing elements, a circuit-closing device in circuit with the motor, a movable member of said circuit-closing device arranged to be moved by any key-lever to close the circuit through the motor and thereby cause the movable element of said motor to operate all the printing elements, substantially as described.

28. In an electrically-operated type-writing machine having key-levers, the combination with printing elements comprising a type-wheel, a hammer and a carriage, of an electric motor having a movable element, link connections between said movable element and each of the printing elements, a circuit-closing device in circuit with the motor consisting of a fixed contact-piece and a movable contact-bar extending across the key-levers, whereby movement of any key-lever will close the circuit through the motor and operate all the printing elements, substantially as described.

29. In an electrically-operated type-writing machine having keys, the combination with printing elements including a type-wheel and hammer, of an electric motor having a movable element, link connections between said movable element and each of the printing elements, and a circuit-closing device in circuit with the motor operated by the movement of any key to close the circuit through the motor and cause said movable element to operate the printing elements, substantially as described.

30. In an electrically-operated type-writing machine having keys, the combination with printing elements including a type-wheel and a carriage, of an electric motor having a movable element, link connections between said movable element and each of the printing elements and a circuit-closing device in circuit with the motor operated by the movement of any key to close the circuit through the motor and cause said movable element to operate the printing elements, substantially as described.

31. In an electrically-operated type-writing machine having keys, the combination with printing elements including a hammer and a carriage, of an electric motor having a movable element, link connections between said movable element and each of the printing elements, and a circuit-closing device in circuit with the motor operated by the movement of any key to close the circuit through the motor and cause said movable element to operate the said printing elements, substantially as described.

32. In an electrically-operated type-writing machine having key-levers, the combination with printing elements including a type-wheel and a hammer, of an electric motor having a movable element, a link connection between said movable element and each of said printing elements, a circuit-closing device in circuit with the motor, a movable member of said circuit-closing device arranged to be moved by any key-lever to close the circuit through the motor and thereby cause the movable element to operate the said printing elements, substantially as described.

33. In an electrically-operated type-writing machine having key-levers, the combination with printing elements including a type-wheel and a carriage, of an electric motor having a movable element, a link connection between said movable element and each of the printing elements, a circuit-closing device in circuit with the motor, a movable member of said circuit-closing device arranged to be moved by any key-lever to close the circuit through the motor and thereby cause the movable element to operate the said printing elements, substantially as described.

34. In an electrically-operated type-writing machine having key-levers, the combination with printing elements including a hammer and a carriage, of an electric motor having a movable element, a link connection between said movable element and each of the printing elements, a circuit-closing device in circuit with the motor, a movable member of said circuit-closing device arranged to be moved by any key-lever to close the circuit through the motor and thereby cause the movable element to operate each of the said printing elements, substantially as described.

35. In an electrically-operated type-writing machine having key-levers, the combination with printing elements comprising a type-wheel, a hammer and a carriage, of an electric motor having a movable element, a link connection between said movable element and each of said printing elements, a circuit-closing device in circuit with the motor consisting of a fixed contact-piece and a movable contact-bar extending across the key-levers, whereby movement of any key-lever will close the circuit through the motor and operate all the printing elements, substantially as described.

36. In an electrically-operated type-writing machine having key-levers, the combination with printing elements including a type-wheel and a hammer, of an electric motor having a movable element, link connections between said movable element and each of said printing elements, a circuit-closing device in circuit with the motor consisting of a fixed contact-piece and a movable contact-bar engaging the key-levers, whereby movement of any key-lever will close the circuit through the motor, substantially as described.

37. In an electrically-operated type-writing machine having key-levers, the combination with printing elements including a type-wheel and a carriage, of an electric motor having a movable element, link connections between said movable element and each of the said printing elements, a circuit-closing device in circuit with the motor consisting of a fixed contact-piece and a movable contact-bar extending across the key-levers, whereby movement of any key-lever will close the circuit through the motor, substantially as described.

38. In an electrically-operated type-writing machine having key-levers, the combination with printing elements including a hammer and a carriage, of an electric motor having a movable element, link connections between said movable element and each of said printing elements, a circuit-closing device in circuit with the motor consisting of a fixed contact-piece and a movable contact-bar extending across the key-levers, whereby movement of any key-lever will close the circuit through the motor, substantially as described.

39. In an electrically-operated type-writing machine having movable keys, the combination with printing elements comprising a type-wheel, a hammer and a carriage, of an electric motor having a movable element, connections between said movable element and each of said printing elements, a circuit-closing device in circuit with the motor operated by the movement of any key to close the circuit through the motor and thereby cause the movable element of said motor to operate all the printing elements, substantially as described.

40. In an electrically-operated type-writing machine having key-levers, the combination with printing elements comprising a type-wheel, a hammer and a carriage, of an electric motor having a movable element, connections between said movable element and each of the printing elements, a circuit-closing device in circuit with the motor, a movable member of said circuit-closing device arranged to be moved by any key-lever to close the circuit through the motor and thereby cause the movable element of said motor to operate all the printing elements, substantially as described.

41. In an electrically-operated type-writing machine having key-levers, the combination with printing elements comprising a type-wheel, a hammer and a carriage, of an electric motor having a movable element, connections between said movable element and each of the printing elements, a circuit-closing device in circuit with the motor consisting of a fixed contact-piece and a movable contact-bar extending across the key-levers, whereby movement of any key-lever will close the circuit through the motor and operate all the printing elements, substantially as described.

42. In an electrically-operated type-writing machine having keys, the combination with printing elements including a type-wheel and hammer, of an electric motor having a movable element, connections between said movable element and each of the printing elements, and a circuit-closing device in circuit with the motor operated by the movement of any key to close the circuit through the motor and cause said movable element to operate the printing elements, substantially as described.

43. In an electrically-operated type-writing machine having keys, the combination with printing elements including a type-wheel and a carriage, of an electric motor having a movable element, connections between said movable element and each of the printing elements and a circuit-closing device in circuit with the motor operated by the movement of any key to close the circuit through the motor and cause said movable element to operate the printing elements, substantially as described.

44. In an electrically-operated type-writing machine having keys, the combination with printing elements including a hammer and a carriage, of an electric motor having a movable element, connections between said movable element and each of the printing elements, and a circuit-closing device in circuit with the motor operated by the movement of any key to close the circuit through the motor and cause said movable element to operate the said printing elements, substantially as described.

45. In an electrically-operated type-writing machine having key-levers, the combination with printing elements including a type-wheel and a hammer, of an electric motor having a movable element, a connection between said movable element and each of said printing elements, a circuit-closing device in circuit with the motor, a movable member of said circuit-closing device arranged to be moved by any key-lever to close the circuit through the motor and thereby cause the movable element to operate the said printing elements, substantially as described.

46. In an electrically-operated type-writing machine having key-levers, the combination with printing elements including a type-wheel and a carriage, of an electric motor having a movable element, a connection between said movable element and each of the printing elements, a circuit-closing device in circuit with the motor, a movable member of said circuit-closing device arranged to be moved by any key-lever to close the circuit through the motor and thereby cause the movable element to operate the said printing elements, substantially as described.

47. In an electrically-operated type-writing machine having key-levers, the combination with printing elements including a hammer and a carriage, of an electric motor having a movable element, a connection between said movable element and each of the printing elements, a circuit-closing device in circuit with the motor, a movable member of said circuit-closing device arranged to be moved by any key-lever to close the circuit through the motor and thereby cause the movable element to operate each of the said printing elements, substantially as described.

48. In an electrically-operated type-writing machine having key-levers, the combination with printing elements comprising a type-wheel, a hammer and a carriage, of an electric motor having a movable element, a connection between said movable element and each of said printing elements, a circuit-closing device in circuit with the motor consisting of a fixed contact-piece and a movable contact-bar extending across the key-levers whereby movement of any key-lever will close the circuit through the motor and operate all the printing elements, substantially as described.

49. In an electrically-operated type-writing machine having key-levers, the combination with printing elements including a type-wheel and a hammer, of an electric motor having a movable element, connections between said movable elements and each of the said printing elements, a circuit-closing device in circuit with the motor consisting of a fixed contact-piece and a movable contact-bar extending across the key-levers, whereby movement of any key-lever will close the circuit through the motor, substantially as described.

50. In an electrically-operated type-writing machine having key-levers, the combination with printing elements including a type-wheel and a carriage, of an electric motor having a movable element, connections between said movable element and each of the said printing elements, a circuit-closing device in circuit with the motor consisting of a fixed contact-piece and a movable contact-bar extending across the key-levers, whereby movement of any key-lever will close the circuit through the motor, substantially as described.

51. In an electrically-operated type-writing machine having key-levers, the combination with printing elements including a hammer and a carriage, of an electric motor having a movable element, connections between said movable element and each of said printing elements, adapted to directly and positively move each of said elements, a circuit-closing device in circuit with the motor consisting of a fixed contact-piece and a movable contact-bar extending across the key-levers, whereby movement of any key-lever will close the circuit through the motor, substantially as described.

52. In an electrically-operated type-writing machine having key-levers, the combination with the type-wheel bearing characters adapted to be brought into printing position by the vibration of the type-wheel, and means for arresting the type-wheel at different points corresponding to the character to be printed, of an electric motor having a movable element with a constant travel, a link having a yielding element in sliding contact therewith between said movable element and the type-wheel, a circuit-closing device in circuit with the motor and operated by the movement of any key-lever to close the circuit through the motor, whereby constant travel of the movable element of the motor will transmit through said yielding connection differential movements to the type-wheel corresponding to the position of the character to be printed, substantially as described.

53. In an electrically-operated type-writing machine having key-levers, the combination with the type-wheel bearing characters adapted to be brought into printing position by the vibration of the type-wheel, and stops for arresting the type-wheel at different points corresponding to the character to be printed, of an electric motor having a movable element with a constant travel, a link between said movable element and the type-wheel having a yielding element in sliding connection with said link, a circuit-closing device in circuit with the motor and operated by the movement of any key-lever to close the circuit through the motor, whereby constant travel of the movable element of the motor will transmit through said connection differential movement to the type-wheel corresponding to the position of the character to be printed, substantially as described.

54. In an electrically-operated type-writing machine having key-levers, the combination with the type-wheel bearing characters adapted to be brought into printing position by the vibration of the type-wheel, and stops for arresting the type-wheel at different points corresponding to the character to be printed, of an electric motor having a movable element with a constant travel, a link connection between said movable element and the type-wheel, a yielding element forming a part of said link connection, said yielding element being arranged to transmit a substantially uniform force of vibration to the type-wheel, a circuit-closing device in circuit with the motor and operated by the movement of any key-lever to close the circuit through the motor, whereby constant travel of the movable element will transmit differential movements to the type-wheel according to the position of the character to be printed and also will impart a substantially uniform force of vibration to the type-wheel for every printing position, substantially as described.

55. In a type-writing machine having a type-wheel, keys, mechanism controlled by the depression of the keys for moving the type-wheel to printing position, a carriage and a hammer, and mechanism for operating said carriage and hammer, the combination of an electromagnetic device, a link connection between said electromagnetic device and each of said printing elements, and a circuit-closing device operated by the movement of any key for closing the circuit through the electromagnetic device, whereby the electromagnetic device is energized as each key is depressed, and the printing elements operated, substantially as described.

56. In a type-writing machine having a type-wheel, keys, mechanism controlled by the depression of the keys for moving the type-wheel to printing position, a carriage, a hammer, and mechanism for operating said carriage and hammer, the combination of an electromagnetic device, a link connection between the hammer and carriage and said electromagnetic device, a link connection between said electromagnetic device and the type-wheel-moving mechanism, said latter link connection having a yielding element interposed between the electromagnetic device and the type-wheel-moving mechanism, and a circuit-closing device, for closing the circuit, operated by any key as it is depressed, substantially as described.

57. In a type-writing machine having key-levers, the combination with a vibrating type-wheel and a rock-shaft connected to the said wheel for vibrating the same, of an electromagnetic device located on the fixed frame of the machine, a bell-crank having one arm connected to the movable element of said electromagnetic device, a link connecting the other arm of the said bell-crank with the rock-shaft, and a circuit-closing device operated by the movement of a key-lever to close the circuit through said electromagnetic device, substantially as described.

58. In a type-writing machine having key-levers, the combination with a vibrating wheel and a rock-shaft connected therewith for vibrating the same, of an electromagnetic device located on the fixed frame of the machine, a bell-crank having one arm connected to the movable element of the electromagnetic device, a link connected to the other arm of said bell-crank, a yielding connection between said link and the rock-shaft, and a circuit-closing device operated by the movement of any key-lever to close the circuit through said electromagnetic device, substantially as described.

59. In a type-writing machine having key-levers, the combination with the printing elements including a type-wheel and a hammer, of an electromagnetic device, a connection between the movable element of said electromagnetic device and the type-wheel for vibrating the same, a rod connected with the hammer for operating the same, a lever connected to the movable element of the electromagnetic device, a detachable connection between said rod and lever, a spacing-lever, a carriage, means controlled by the spacing-lever for operating the carriage, and a device operated by the movement of the spacing-lever to release the detachable connection between the hammer-operating rod and its connected lever, substantially as described.

60. In a type-writing machine having key-levers, a type-wheel, carriage and coöperating elements for moving the same, the combination with a spacing-lever controlling the carriage-operating mechanism, of an electromagnetic device, connections between the movable element of said electromagnetic device and the type-wheel and carriage, a hammer, an operating-rod connected therewith, a pivoted catch on said rod, a lever connected to the movable element of the electromagnetic device, a detent on said lever normally engaging the catch on the hammer-rod, and an arm on the spacing-lever normally out of contact with the catch and adapted to release the catch from the detent when the spacing-lever is moved, and means for closing the circuit through the electromagnetic device by the movement of the spacing-lever, substantially as described.

61. In a type-writing machine having key-levers, the combination with a vibrating type-wheel, of a cam connected therewith, a rock-shaft connected to the cam and adapted to vibrate the cam on either side of its position of rest, and mechanism controlled by the key-levers for vibrating the rock-shaft, substantially as described.

62. In a type-writing machine having key-levers, the combination with a vibrating type-wheel, a shaft on which said wheel is mounted, a cam having a slot therein, a rock-shaft having its arm in engagement with the cam-slot, means controlled by the movement of the key-levers for throwing the cam slightly to one side or the other of its normal position according to the character to be printed, and mechanism controlled by the key-levers for vibrating the rock-shaft, substantially as described.

63. In a type-writing machine having key-levers, the combination with a vibrating type-wheel, a shaft on which said wheel is mounted, a heart-shaped cam mounted on said shaft, springs bearing on each side of the point of the said cam, one of which is adapted to be withdrawn from contact therewith by the movement of any key-lever, whereby the cam is moved by the other spring to one side of its normal position, and means controlled by the movement of any key-lever for vibrating the rock-shaft, substantially as described.

64. In a type-writing machine having key-levers, the combination with a vibrating type-wheel, a shaft carrying the same, a heart-shaped cam on said shaft, a rock-shaft having its arm engaging said cam, of a motor having a movable element, a connection between said movable element and the rock-shaft, means controlled by the movement of any key-lever to operate said motor, springs bearing upon opposite sides of the cam, and connections between each of the springs and the key-levers and adapted to move one of them out of contact with the cam when a key-lever is moved, substantially as described.

65. In a type-writing machine, the combination with a vibrating type-wheel, a shaft carrying the same, a heart-shaped cam on said shaft, a rock-shaft having its arm engaging the cam, of an electric motor having a movable element, a circuit-closing device operated by the depression of the keys for closing the circuit through the motor, springs bearing on each side of the cam, the movable element of the circuit-closing device adapted to release one of the springs from the cam when any key-lever is depressed, and connections between the movable element of the motor and the rock-shaft, substantially as described.

66. In a type-writing machine, the combination with a vibrating type-wheel, a shaft carrying the same, a cam on said shaft, a rock-shaft having an arm engaging the cam for vibrating the same, of an electric motor having a movable element, a link connection between the rock-shaft and the said movable element, a circuit-closing device having a movable element consisting of a contact-bar extending across the key-levers, a spring bearing on each side of the cam, and a projection on the contact-bar for moving one of the springs out of contact with the cam to permit the other to press the cam slightly to one side of its normal position of rest when any key-lever is depressed, substantially as described.

67. In a type-writing machine having key-levers, type-wheel, impression device and carriage, the combination of a motor having a movable element, a link connection having a yielding element between the movable element and the type-wheel, a link connection between said movable element and the impression device, and a link connection between the said movable element and the carriage, with means controlled by the movement of any key-lever for causing the movable element of the motor to actuate said link connections, substantially as described.

68. In an electrically-operated type-writing machine having key-levers, the combination with printing elements comprising a type-wheel, a hammer and a carriage, of an electric motor having a movable element, a link connection having a yielding element between said movable element and the type-wheel, a link connection between said movable element and the hammer, a link connection between said movable element and the carriage, and a circuit-closing device in circuit with the motor controlled by the movement of any key to close the circuit through the motor, substantially as described.

69. In a type-writing machine having key-levers, the combination with a vibrating type wheel or carrier, mechanism controlled by the key-levers for vibrating the same to the one side or the other of a position of rest, and means controlled by the key-levers for causing the vibrating mechanism to impart a motion of vibration to the type wheel or carrier to the one side or the other of the position of rest, substantially as described.

70. In a type-writing machine having key-levers, the combination with a vibrating type wheel or carrier, means controlled by the key-levers for vibrating the same to the one side or the other of a position of rest, a cam connected to the type wheel or carrier forming an element of said vibrating means, and mechanism controlled by the key-levers for causing the cam to impart a motion of vibration to the type wheel or carrier to the one side or the other of the position of rest, substantially as described.

In testimony whereof we have signed our names to this specification in the presence of two subscribing witnesses.

JOHN S. HARRISON.
HERMANN HILL.

Witnesses:
T. F. COOK,
WM. L. GIGNILLIAT.